United States Patent [19]

Evans

[11] 4,116,539

[45] Sep. 26, 1978

[54] MULTI-POSITION FOCUSING APPARATUS

[76] Inventor: Ralph S. Evans, 1861 Inlet Dr., North Fort Myers, Fla. 33903

[21] Appl. No.: 834,827

[22] Filed: Sep. 20, 1977

[51] Int. Cl.² .............................................. G02B 5/08
[52] U.S. Cl. .................................. 350/292; 350/289; 350/85
[58] Field of Search .................................. 350/82–85, 350/289, 292, 295, 299, 22, 81; 356/141, 152; 128/270, 271; 89/41 E; 33/275 R, 268, 349; 250/203 R

[56] References Cited

U.S. PATENT DOCUMENTS

| | | | |
|---|---|---|---|
| 2,471,954 | 5/1949 | Harvey | 350/292 |
| 3,229,101 | 1/1966 | Chitayat | 250/203 R |
| 3,580,363 | 5/1971 | Plawner | 350/83 |
| 3,713,727 | 1/1973 | Markosian et al. | 350/292 |

FOREIGN PATENT DOCUMENTS 386,264  12/1923  Fed. Rep. of Germany ........... 126/270

Primary Examiner—Jon W. Henry
Attorney, Agent, or Firm—Salvatore G. Militana

[57] ABSTRACT

A multi-position focusing apparatus having a plurality of pads mounted about a centerline receiving ray reflecting members or energy emitting devices thereon, whereby the pads are focused along the centerline on a desired point in space to concentrate all of the energy on the selected point and when once focused, upon operating the apparatus at substantially all positions of the pads, the focal point of the pads will lie in a common point along the centerline.

12 Claims, 4 Drawing Figures

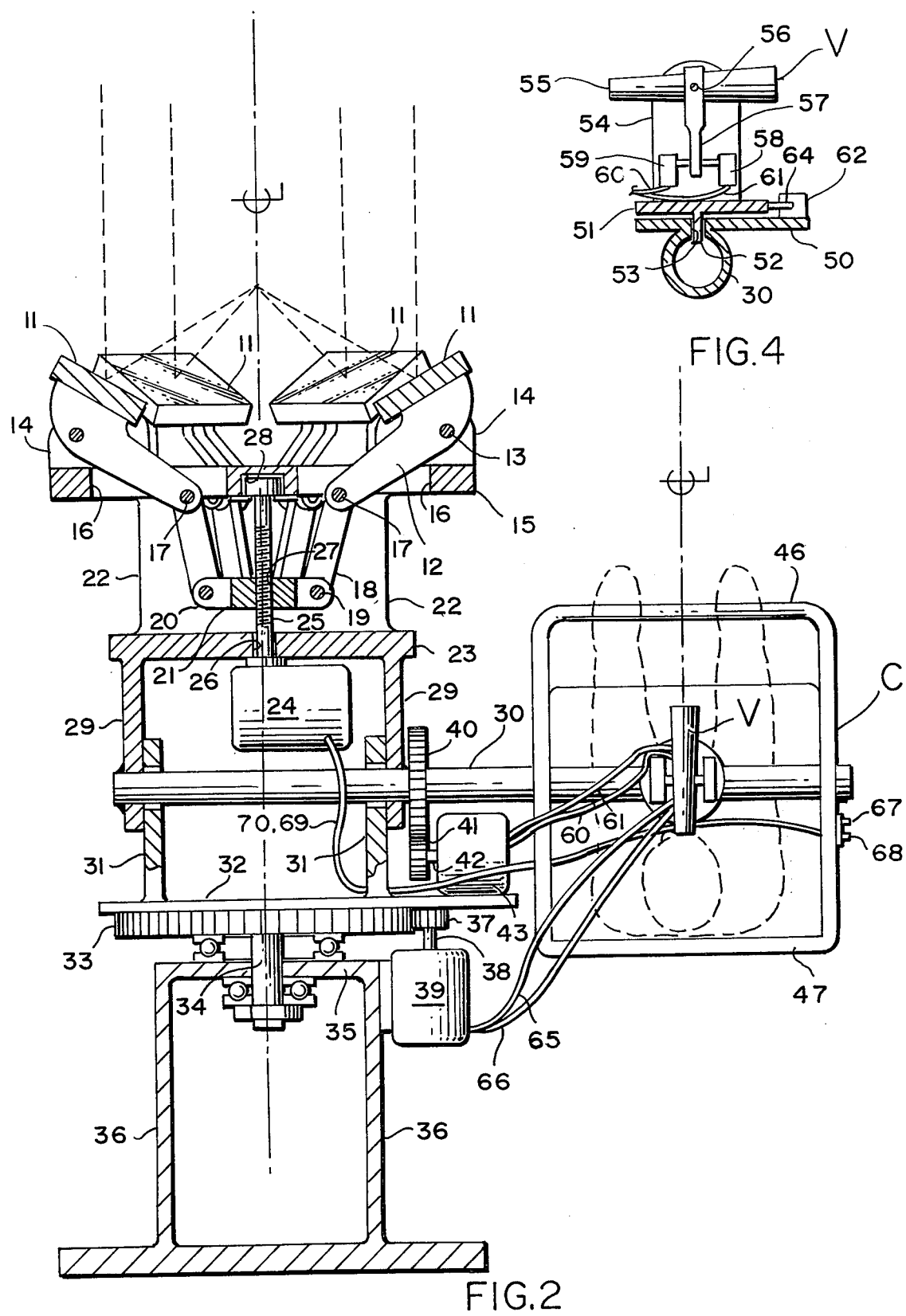

MULTI-POSITION FOCUSING APPARATUS

BACKGROUND OF THE INVENTION

1. Field of the Invention

This invention relates to a multi-position focusing device for energy receiving or emitting devices having a plurality of pads mounted about a centerline that are mutually focused on the centerline for all positions of the pads.

2. Description of the Prior Art

There are no conventional multi-position focusing apparatus which focus a plurality of energy receiving and reflection devices or energy emitting devices so as to concentrate the energy in one spot in space, namely, the focal point of the devices, and when once focused, operation of the apparatus will automatically maintain the devices on a common focal point along the centerline for substantially any spot in space. At the present time, for example, if a person wishes to concentrate the rays of the sun at a solar furnace, a plurality of reflectors are positioned about the solar furnace and individually manipulated to focus the reflected sun's rays at the solar furnace. The present invention contemplates the automatic focusing of these devices which when once focused, are mutually focused at all times and remain so upon movement of the devices.

SUMMARY OF THE INVENTION

Therefore, a principal object of the present invention is to provide a multi-position focusing apparatus with pads that are automatically focused for all positions between coplanar relationship of the pads when the focal point is at infinity to parallel relationship of the pads when the focal point is at zero distance from the pads after the pads have been initially focused.

Another object of the present invention is to provide a multi-position focusing device with pads for mounting reflectors thereon, which will reflect sources of energy received thereon to a focal point on a centerline in concentrated form at any desired distance in space.

A further object of the present invention is to provide a multi-position focusing device with pads for mounting reflectos thereon, which will receive energy from a single source and reflect said energy back to a focal point at any desired distance in space.

A further object of the present invention is to provide a multi-position focusing device with pads when once in focus will remain in focus with each other for all positions thereof.

A still further object of the present invention is to provide a multi-position focusing device with monitoring apparatus that permits a person to direct the device to any spot in space and mutually focusing the rays of energy that is being received from or emitted to the spot in space.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In the drawings:

FIG. 2 is a similar view with the apparatus focused directly upward with a portion of the apparatus shown in cross section.

FIG. 4 is an elevational view of the viewing structure shown in FIG. 3.

DESCRIPTION OF THE PREFERRED EMBODIMENT

Figures 1, 3:
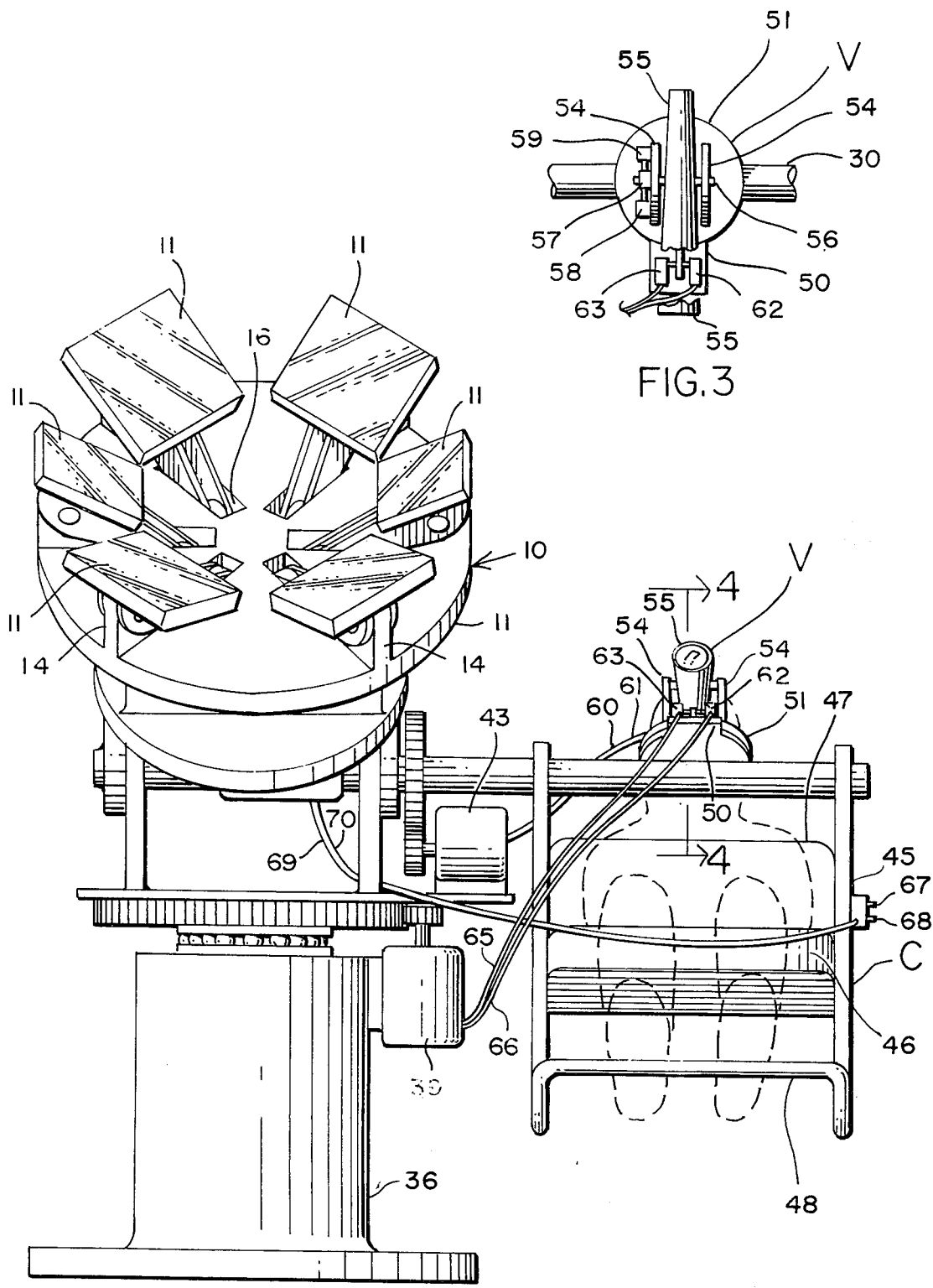
FIG. 1 is a front elevational view of my multiposition focusing apparatus showing a person operating same.
FIG. 3 is a fragmentary top plan view of the viewing structure of my apparatus.

Referring to the drawings wherein like numerals are used to describe similar parts throughout the several views, the numeral 10 refers to my multi-position focusing apparatus consisting of a plurality of pads 11 positioned about in a circle having a centerline or axis as indicated in FIG. 2 and mounted on one end of fulcrum arms or levers 12. Intermediate the ends of the levers 12 are pivot pins 13, that pivotally secure the levers 12 to support member 14 positioned on each side of the levers 12 and extending upwardly of a support plate or disk 15. The support plate 15 is provided with a plurality of openings 16 through which the fulcrum arms 12 extend with the other end of the fulcrum arms 12 being pivotally mounted by pivot pins 17 to one end of linkage members 18. The other end of the links 18 are pivotally mounted by pivot pins 19 to the arms 20 of a horizontally disposed spider member 21. The support plate 15 is itself supported by upright support members 22 that are mounted on a mounting plate 23. A motor 24 that is secured to the lower surface of the mounting plate 23 is provided with a threaded motor shaft 25 extending through an opening 26 in the mounting plate 23 and threadedly received by an axially disposed threaded opening 27 in the spider member 21. The free end of the motor shaft 25 consists of a head portion 50 rotatably mounted in a socket 28 formed on the lower surface of the support plate 15, the head portion 50 being secured against leaving the socket 28 by means of a disk 51 fastened to the support plate 15. It can be seen that upon energizing the motor 24, the threaded motor shaft 25 will rotate to cause the spider member 21 to slide upwardly and downwardly therealong and the fulcrum arms 12 to pivot about the pivot pins 13 in a symmetrically disposed manner. All of the pads 11 become positioned at the same angle with relation to the axis of the motor shaft 25 so that all of the pads 11 will focus on a spot on the extended axis of the motor shaft 25 for all positions of the pads 11 except when lying horizontally in a common plane.

The mounting plate 23 is supported by a pair of upright support members 29 whose lower ends are secured to a shaft 30 which in turn is rotatably mounted on the upper ends of a pair of support arms 31 whose lower ends are secured to a turntable 32. A ring gear 33 is mounted on the lower surface of the turntable 32 and is provided with a shaft 34 supported on a platform 35. The latter is mounted on the top portion of side walls 36. The ring gear 33 is in mesh engagement with a spur gear 37 mounted on a motor shaft 38 of a motor 39 which is secured to the side wall 36.

The shaft 30 which extends beyond the support wall 29 is provided with a ring gear 40 mounted adjacent to the side support wall 29. A spur gear 41 that is in mesh engagement with the ring gear 40 is mounted on a motor shaft 42 of a motor 43 resting on the turntable 32. It is readily noted from the above description of my focusing apparatus 10 that upon energizing the motor 39 the turntable 32 and the mechanism mounted thereon will rotate in a horizontal plane about the axis of the vertical shaft 34. Upon energizing the motor 43, the structure carrying the pads 11 will rotate in a vertical plane about the axis of the horizontal shaft 30.

Mounted on the end portion of the shaft 30 that extends beyond the apparatus described hereinabove is a chair —C— on which the operator of the apparatus 10 is seated. The chair —C— is supported by side members 45 whose upper end portions are secured to the shaft 30 so as to be fixed in relation to the shaft 30. When the shaft 30 rotates about its axis the chair —C— and supports 45 will swing in accordance therewith. The chair —C— is provided with the usual seat 46 backrest 47 and footrest 48.

Mounted on the shaft 30 is a viewing or telescopic apparatus —V— having a base plate 50 welded or otherwise secured to the shaft 30. A second base plate 51 is rotatably mounted on the first base plate 50 having a centrally disposed pin 52 extending into an opening 53 in the base plate 50. Extending upwardly of the base plate 51 is a pair of telescope supporting members 54 between which a telescope 55 is pivotally mounted by a pivot shaft 56. A bifurcated arm 57 that is secured to one end of the pivot shaft 56 and extending downwardly will swing from side to side as the telescope 55 is pivoted in a vertical plane about its pivot shaft 56. On either side of the arm 57 are switches 58 and 59 that are engaged by the arm 57 when the telescope 55 is swung through as small an arc as a fraction of a degree. The switches 58 and 59 are connected by wires 60 and 61 to the motor 43 to compel the axis 25 of the pad structure 11 to always be parallel to that of the telescope 55. When the telescope 55 is pivoted vertically fraction of a degree, the arm 57 engages either of the switches 58 and 59 which energizes the motor 43 to rotate the shaft 42, gears 41 and 40 which in turn rotates the shaft 30 causing all of the structure mounted on the shaft 30 to swing together to a new position. If and when the telescope 55 is pointed directly at the object being viewed, so will the axis 25 of the pad structure be directed at the object being viewed since the aforementioned axis always remains parallel to that of the telescope 55. The switches 58 and 59 cause the motor 43 to rotate in opposite directions.

In order to permit the telescope 55 to swing throughout 360 degrees about the horizon, a second pair of switches 62 and 63 are mounted on the base 50 beyond the telescope plate 51. A finger 64 extends outwardly of the plate 51 between the switches 62 and 63. The latter are connected by wires 65 and 66 to the motor 39 so that a slight turning movement of the telescope 55 to the right or left will cause the finger 64 to engage one of the switches 62 and 63 which in turn energizes the motor 39 to revolve the turntable 32 and direct the telescope 55 and axis 25 of the pad structure at the object being viewed.

It is readily noted from the above description of my focusing apparatus 10, that by upon movement of the telescope 55 in both the horizontal or vertical directions, the above described mechanism of the pads 11 will move to maintain the axis 25 parallel with that of the telescope 55. Consequently, the angular position of the pads 11 will all be identical with each other so that upon operating the switches 67, 68, the pads 11 will focus on any selected spot. If mirrors have been placed on the pads 11, and a solar furnace at the spot focused on, the solar rays will be reflected and concentrated on that spot. If a source of energy is positioned at the focal point of the pads 11, the pads 11 will reflect the rays of energy into space in parallel rays. If the rays of a star, for example, are to be received by my device 10, viewing devices are mounted on the pads 11 and directed toward the star being viewed. The light received by each viewing device can then be relfected into one eyepiece positioned at the focal point of the pads 11 thereby increasing the viewing power thereof.

Changing of the focal length of the pads 11 is accomplished by a pair of switches 67 and 68 mounted on The seat support 45. The switches 67 and 68 are connected by wires 69 and 70 to the motor 24. Upon the operator pressing either of the switches 67 and 68, the motor 24 becomes energized and causes the shaft 25 to rotate, which in turn will effect a pivotal movement of the pads 11 either toward or away from facing each other in order to achieve the desired focal length.

What I claim as new and desire to secure by Letters Patent is:

1. A multi-position focusing apparatus comprising a plurality of article receiving members substantially symmetrically disposed with relation to each other about a centerline, first support means, first pivot means mounting each said member on said first support means for individual pivotal movement of said members in a different vertical plane passing through said centerline, second support means supporting said first support means, means operatively connecting said members for simultaneous pivotal movement thereof, second pivot means engaging said first support means and mounted on said second support means for simultaneous pivotal movement of said members in a vertical plane, third support means, third pivot means mounting said second support means on said third support means for swinging movement of said first and second support means about said third support means in a vertical plane, fourth support means supporting said third support means and fourth pivot means for rotating said third support means in a horizontal plane.

2. The structure as recited by claim 1 wherein said article receiving members are pads and said pads are disposed about said centerline whereby said pads are focused at a point on said centerline for substantially all positions of said pads.

3. The structure as recited by claim 2 wherein said first pivot means comprises a plurality of levers each having said pads mounted at one end, a first pivot pin mounting said levers, and said second pivot means comprising a link having an end connected to the other end of each of said levers, a spider member having a centrally disposed threaded bore and arm portions extending outwardly, second pivot pins securing said arm portions and the other end of each of said links, a threaded shaft extending through said threaded bore and engaging said first support means and first power operated means for rotating said threaded shaft for substantially simultaneous pivotal movement of said pads.

4. The structure as recited by claim 3 wherein said third pivot means comprises a substantially horizontally disposed shaft, a first main gear mounted on said shaft, a first spur gear in mesh arrangement with said first main gear and second power operated means connected to said first spur gear for rotating said main gear.

5. The structure as recited by claim 4 wherein said third support means comprises a base member and said fourth pivot means comprising a ring gear supporting said second support means, said ring gear having a centrally disposed shaft rotatably mounted on said base member, a second spur gear engaging said ring gear and third power operated means for rotating said second spur gear.

6. The structure as recited by claim 4 taken in combination with a seat support member mounted on said third pivot means for simultaneous horizontal and rotational movement with said third pivot means, telescopic means mounted on said seat support member and first switch means opened and closed by movement of said telescopic means to actuate said telescopic means and said second power operated means for simultaneous pivotal movement of said telescopic means and said third pivot means.

7. The structure as recited by claim 6 taken in combination with manually operable switch means mounted on said seat support member for simultaneous pivotal movement of said pads about said first pivot means.

8. The structure as recited by claim 5 taken in combination with a seat support member mounted on said horizontally disposed shaft and secured thereto for simultaneous vertical rotational movement with said shaft, telescopic means mounted on said seat support member for pivotal movement in a horizontal and vertical plane, a plurality of switch means, means connecting said switch means to each of said first, second and third power operated means for respectively adjusting the focal length of said pads, along said centerline, rotating said first and second support means in a vertical plane and rotating said first and second support means in a horizontal plane.

9. The structure as recited by claim 8 taken in combination with a plurality of members mounted on said telescopic means engaging said switch means upon movement of said telescopic means for simultaneous rotating movement of said first and second support means in a vertical and horizontal planes.

10. A multi-position focusing apparatus having an axis and comprising a plurality of support means for receiving energy reflecting or emitting devices disposed about said axis, first pivot means, second pivot means, third pivot means, all of said pivot means operatively mounting said support means, said first pivot means pivoting each of said support means substantially simultaneously toward and away from said axis, said second pivot means swinging all of said support means and said axis in a plane passing through said axis and said third pivot means rotating all of said support means in a plane at substantially right angle to said axis.

11. The structure as recited by claim 10 taken in combination with seat support means, means mounting said seat support means for simultaneous pivotal movement with said second and third pivot means and switch means mounted on said seat support means for actuation of said first pivot means.

12. The structure as recited by claim 11 taken in combination with telescopic means mounted on said seat support means, said telescopic means having a centerline in substantial parallel relation with said axis.

* * * * *